US012617161B2

(12) United States Patent
Restuccia et al.

(10) Patent No.: US 12,617,161 B2
(45) Date of Patent: *May 5, 2026

(54) HYBRID VEIL AS INTERLAYER IN COMPOSITE MATERIALS

(71) Applicant: CYTEC INDUSTRIES INC., Princeton, NJ (US)

(72) Inventors: Carmelo Luca Restuccia, Chester (GB); Robert Blackburn, Hull (GB)

(73) Assignee: CYTEC INDUSTRIES INC., Lawrence, NJ (US)

( * ) Notice: Subject to any disclaimer, the term of this patent is extended or adjusted under 35 U.S.C. 154(b) by 281 days.

This patent is subject to a terminal disclaimer.

(21) Appl. No.: 17/689,779

(22) Filed: Mar. 8, 2022

(65) Prior Publication Data

US 2022/0347940 A1 Nov. 3, 2022

Related U.S. Application Data

(63) Continuation of application No. 15/771,532, filed as application No. PCT/US2016/061506 on Nov. 11, 2016, now Pat. No. 11,745,439.

(Continued)

(51) Int. Cl.
| | |
|---|---|
| B29C 70/02 | (2006.01) |
| B29C 70/00 | (2006.01) |
| B29C 70/08 | (2006.01) |
| B29C 70/16 | (2006.01) |
| B29C 70/30 | (2006.01) |

(Continued)

(52) U.S. Cl.
CPC .......... *B29C 70/025* (2013.01); *B29C 70/003* (2021.05); *B29C 70/08* (2013.01); *B29C 70/16* (2013.01); *B29C 70/30* (2013.01); *B29C 70/50* (2013.01); *B29C 70/547* (2013.01); *B32B 5/022* (2013.01)

(58) Field of Classification Search
CPC .............. A61B 17/8836; A61B 17/686; A61B 17/8802; A61B 17/8872; A61C 8/0009; A61C 8/0089; A61F 2/4675; A61F 2/4601; A61F 2002/4677; A61F 2002/4623; A61F 2002/30235; A61F 2002/2839

See application file for complete search history.

(56) References Cited

U.S. PATENT DOCUMENTS

| | | |
|---|---|---|
| 2001/0006131 A1 | 7/2001 | Bream |
| 2006/0252334 A1 | 11/2006 | LoFaro et al. |

(Continued)

FOREIGN PATENT DOCUMENTS

| | | |
|---|---|---|
| JP | H04249152 A | 9/1992 |
| JP | H11200218 A | 7/1999 |

(Continued)

*Primary Examiner* — Christopher W Raimund
(74) *Attorney, Agent, or Firm* — Thi Dang

(57) ABSTRACT

A flexible, self-supporting hybrid veil that is permeable to liquid and gas. The hybrid veil includes: (a) intermingled, randomly arranged fibres in the form of a nonwoven structure; (b) particles dispersed throughout the nonwoven structure, wherein a majority of the particles are penetrating through the thickness of the nonwoven structure; and (c) a polymeric or resinous binder present throughout the veil. Such hybrid veil can be incorporated into composite laminates, prepregs, fabrics and fibrous preforms.

17 Claims, 6 Drawing Sheets

Related U.S. Application Data

(60) Provisional application No. 62/254,224, filed on Nov. 12, 2015.

(51) Int. Cl.
  *B29C 70/50*     (2006.01)
  *B29C 70/54*     (2006.01)
  *B32B 5/02*      (2006.01)

(56)              References Cited

U.S. PATENT DOCUMENTS

| | | |
|---|---|---|
| 2008/0295955 A1 | 12/2008 | Cawse et al. |
| 2009/0036015 A1 | 2/2009 | Nhan et al. |
| 2010/0098906 A1 | 4/2010 | Bongiovanni et al. |
| 2010/0170746 A1 | 7/2010 | Restuccia et al. |
| 2012/0115388 A1 | 5/2012 | Baidak et al. |
| 2013/0192434 A1 | 8/2013 | Hashimoto et al. |
| 2014/0179187 A1 | 6/2014 | Restuccia et al. |
| 2014/0329045 A1 | 11/2014 | Jones |
| 2014/0370237 A1 | 12/2014 | Ponsolle et al. |
| 2016/0249495 A1 | 8/2016 | Ghosh et al. |

FOREIGN PATENT DOCUMENTS

| | | | | |
|---|---|---|---|---|
| JP | 2008222958 A | * | 9/2008 | |
| JP | 2008251452 A | * | 10/2008 | |
| JP | 2009527626 A | | 7/2009 | |
| JP | 2012514546 A | | 6/2012 | |
| WO | 02/28623 A1 | | 4/2002 | |
| WO | 2005/014952 A1 | | 2/2005 | |
| WO | 2007/100511 A2 | | 9/2007 | |
| WO | 2010/048101 A2 | | 4/2010 | |
| WO | 2012/086682 A1 | | 6/2012 | |
| WO | 2013096377 A2 | | 6/2013 | |
| WO | 2014011293 A2 | | 1/2014 | |

* cited by examiner

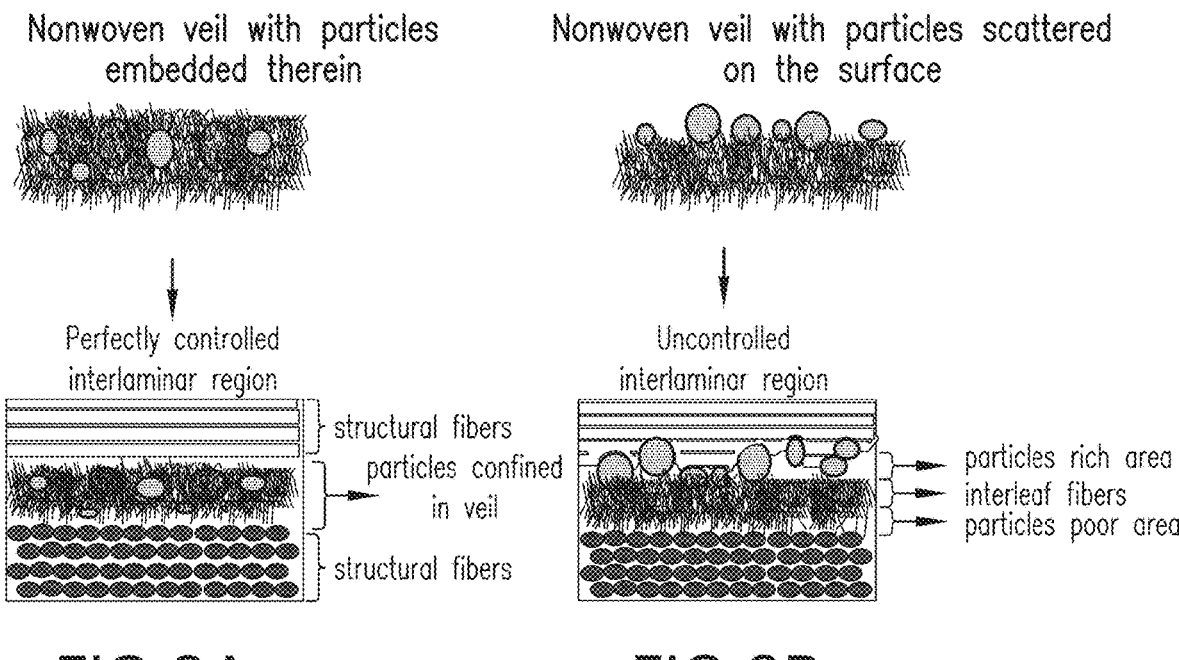
FIG.3A          FIG.3B
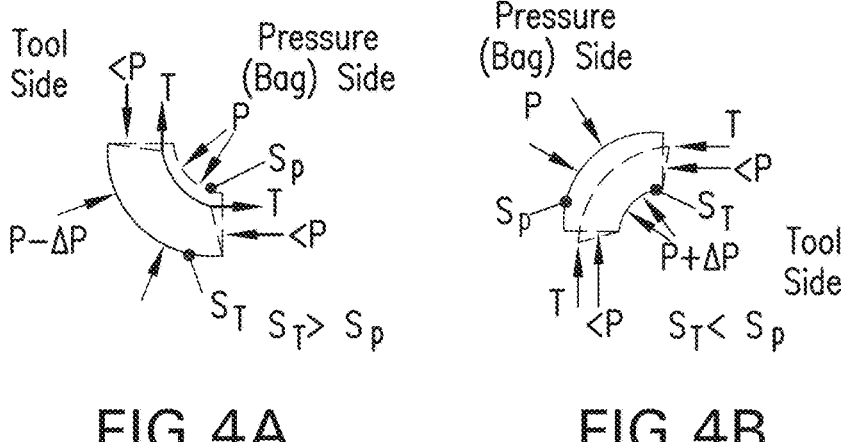
FIG.4A          FIG.4B

CX7323/IM7_6.4gsm

P84G/IM7_9gsm

HYBRID VEIL AS INTERLAYER IN COMPOSITE MATERIALS

The present application is a continuation of U.S. application Ser. No. 15/771,532, filed on 27 Apr. 2018, which is a U.S. national phase entry under 35 U.S.C. § 371 of International Application No. PCT/US2016/061506, filed on 11 Nov. 2016, which claims priority to U.S. provisional Application No. 62/254,224, filed on 12 Nov. 2015, the entire content of each of these prior filed applications is incorporated herein by reference.

The use of fibre-reinforced polymer composites is becoming more prevalent in primary aerospace structures, e.g., fuselage of airplane, as well as in high-performance sporting goods, marine and wind energy structures. The advantages of fibre-reinforced polymer composites include high strength-to-weight ratio, excellent fatigue endurance, corrosion resistance and flexibility, allowing for a significant reduction in component parts, and reducing the need for fasteners and joints.

Conventional methods for producing fibre-reinforced composite materials include impregnating reinforcing fibres with a curable matrix resin to form prepregs. This method is often called a "prepregging" method. Structural composite parts may be made by laying up multiple layers of prepregs on a mold surface followed by consolidation and curing.

More recently, fibre-reinforced polymer composite parts are made by liquid resin infusion processes, which include Resin Transfer Molding (RTM) and Vacuum Assisted Resin Transfer Molding (VARTM). In a typical resin infusion process, a pre-shaped preform of dry fibrous materials is placed in a mold, then liquid resin is injected, usually under high pressure, into the mold in order to infuse the preform directly in-situ. The preform is composed of multiple, resin-free layers of reinforcing fibres or woven fabrics, which are laid up similarly to the way resin-impregnated prepregs are laid up. After resin infusion, the resin-infused preform is cured according to a curing cycle to provide a finished composite article. In resin infusion, the preform to be infused with the resin is a critical element—the preform is in essence the structural part awaiting resin. Liquid resin infusion technology is especially useful in manufacturing complex-shaped structures which are otherwise difficult to manufacture using conventional prepreg layup technologies.

BRIEF DESCRIPTION OF THE DRAWINGS

FIGS. 3A and 3B schematically illustrate a cured composite laminate containing a hybrid veil in the interlaminar region in comparison to a similar cured composite laminate containing a nonwoven veil with toughening particles scattered onto the veil's surface.

FIGS. 4A and 4B schematically illustrate the forces acting on a composite laminate over a concave molding surface and a convex molding surface, respectively.

DETAILED DESCRIPTION

Figure 1:
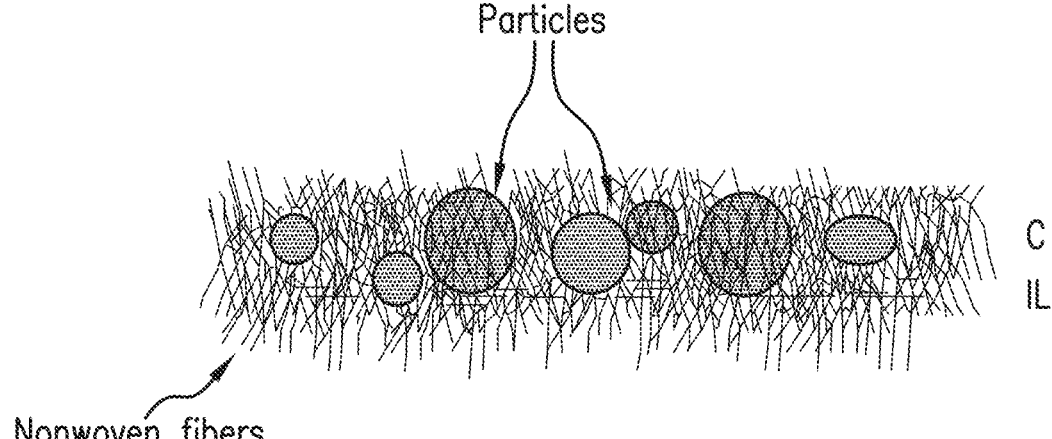
FIG. 1 is a schematic illustration of the hybrid veil according to an embodiment of the present disclosure.

A major weakness of conventional fibre/resin multilayered composites (or composite laminates) is their low interlaminar fracture toughness, which permits delamination of the composite layers upon impact of high energy force. Delamination occurs when two layers de-bond from each other. A cured composite with improved resistance to delamination is one with improved Compression Strength After Impact (CSAI) and fracture toughness. CAI measures the ability of a composite material to tolerate damage. In the test to measure CAI, the composite material is subject to an impact of a given energy and then loaded in compression. Fracture toughness is a quantitative way of expressing a material's resistance to brittle fracture when a crack is present and may be quantified as the strain energy release rate ($G_c$), which is the energy dissipated during fracture per unit of newly created fracture surface area. $G_c$ includes $G_{Ic}$ (Mode 1—opening mode) or $G_{IIc}$ (Mode II—in plane shear). The subscript "Ic" denotes Mode I crack opening, which is formed under a normal tensile stress perpendicular to the crack, and the subscript "IIc" denotes Mode II crack produced by a shear stress acting parallel to the plane of the crack and perpendicular to the crack front. The initiation and growth of a delamination is often determined by examining Mode I and Mode II fracture toughness.

Because of the weak property in the through-thickness direction of the multilayered composites or composite laminates, interlaminar cracks or delaminations are a main failure mode of concern in multilayered composites, especially since such failure modes are often not externally visible. Interlaminar fracture toughness is a key parameter to assess the performance of composites under conditions such as fatigue, compression, or compression after impact. Under these conditions, delaminations due to Mode I and II loading is a principle cause of material failure. Cracks and imperfections resulting in delamination may arise from local variability in materials properties, voids or other imperfections occurring during manufacturing, or through damage sustained in-service.

Furthermore, complex composite parts with bent sections such as L, U or Z shaped sections that are manufactured according to conventional prepreg layup process often show a decreased thickness at bent regions. Such phenomenon leads to the need for re-analyzing the structure to check if the loading resistance requirements can still be met by the thinner parts without any mechanical failure such as delamination or cracks. When the thickness-to-radius ratio increases, the thickness variations also increase, and therefore, every prepreg ply in a composite laminate has a critical ratio above which it cannot be used. Although an extra-compaction force can be applied during the consolidation of the composite laminate to minimize the thinning phenomenon, the fibre reinforcement's architecture and resin composition are still the limiting factor in producing more and more complex geometries and components.

Composite structures with more complex geometries may be fabricated via liquid resin infusion processes such as RTM and VaRTM. In a resin infusion process, the preform is positioned in a mould, which is injected with a curable liquid resin to wet out the fibre layers. The matrix resin for RTM and VaRTM systems must possess a very low injection viscosity to allow complete wetting and infusion of the preform. Prior attempts to improve the toughness of the composite material have included adding soluble thermoplastic tougheners to the resin before it is injected into the mold. However, the addition of thermoplastic tougheners in the resin leads to an increase in viscosity, and consequently, the amount of tougheners that can be added is limited by the low viscosity that is necessary for liquid resin injection. This limitation renders the addition of tougheners conventionally added to prepregs unsuitable in liquid resin infusion applications.

An alternative solution has been to disperse insoluble thermoplastic or rubber toughening particles in the resin prior to resin infusion. However, unless the particles are very small (e.g. sub-micron sized), the particles will be filtered by the reinforcement fibres in the preform, resulting in a non-uniform distribution of the particles and undesirable localized concentrations of particles in the final product. Moreover, this filtering effect may lead to complete blocking of the preform from further injection or infusion of the resin. Again, the type and amount of particles that can be added to a liquid resin to be used in resin infusion is limited.

There remains a need for a multifunctional interlaminar toughening solution suitable for multiple composite product forms including prepregs, preforms for resin infusion, fabrics and dry textiles suitable for automated deposition methods, e.g. Automated Fibre Placement (AFP) and Automated Tape Layup (ATL). It would be desirable to have a multifunctional interlaminar material that can simultaneously improve the fracture toughness and compressive strength properties of the cured laminates while maintaining or improving the bulk conductivity, and also can overcome the current material limitations connected to the thinning issues in composite parts with bent sections.

A multifunctional veil, also referred to as "hybrid veil", is described herein as well as composite laminates, prepregs, fabrics, and fibrous preforms having such veil incorporated therein.

Hybrid Veil

Figure 2:
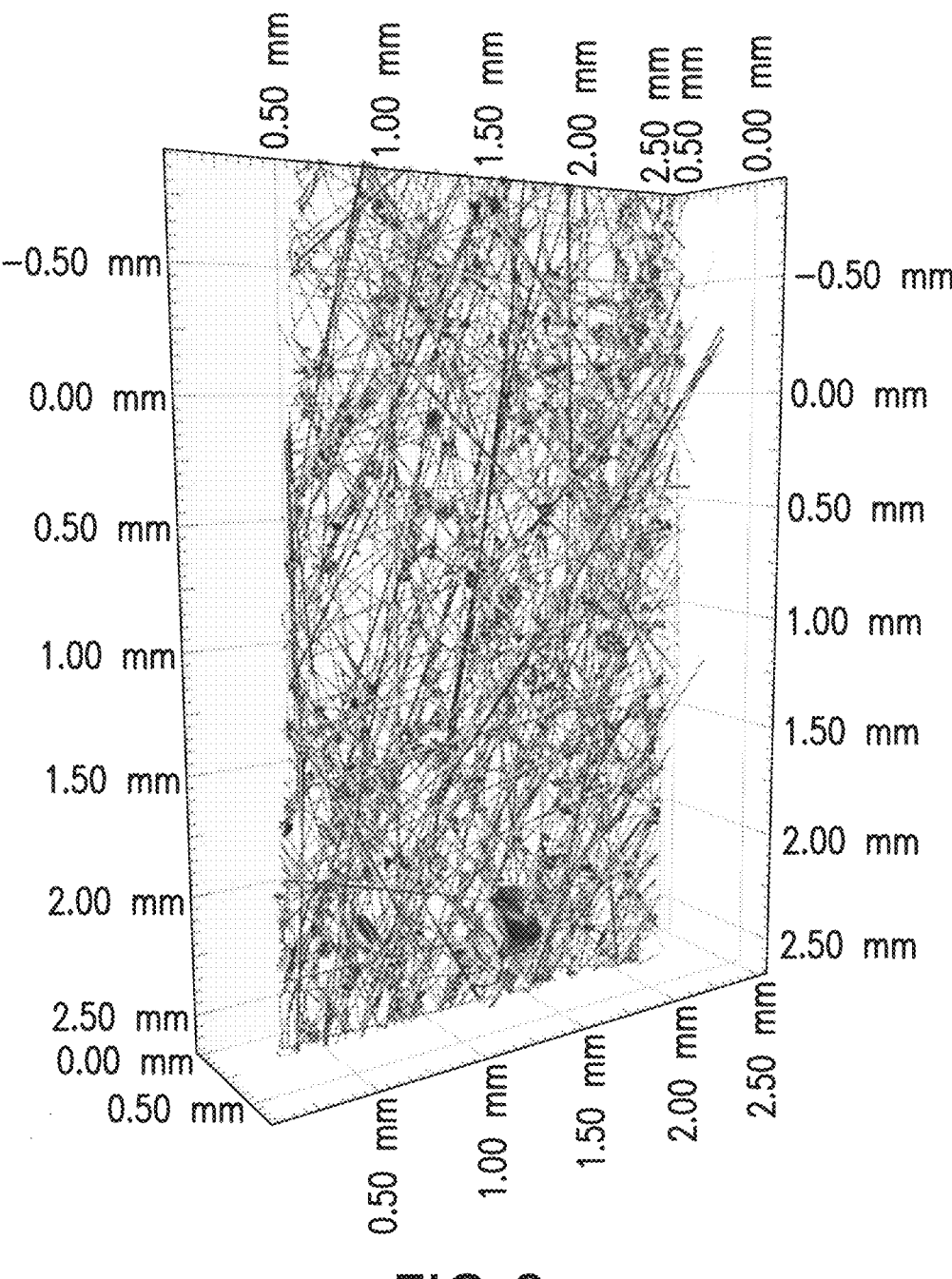
FIG. 2 is a 3D reconstructed image obtained by Computerised Tomography of an actual hybrid veil that was formed by a wet-laid process.

The hybrid veil being disclosed herein is a low areal weight multifunctional veil that may be used as an interlaminar material in fibre-reinforced polymer composites. The hybrid veil is a flexible, self-supporting, nonwoven structure composed of intermingled, randomly arranged fibres and particles dispersed throughout the nonwoven structure, wherein a majority of the particles are penetrating through the thickness of the nonwoven structure. In one embodiment, the particles are homogeneously dispersed throughout the nonwoven structure. The veil also contains a small amount of polymeric or resinous binder in sufficient amount to hold the fibres and particles together and to maintain the integrity of the veil. The binder is present throughout the veil. As such, the veil is self-supporting—meaning that it is a separate structure which does not require another supporting carrier. The particles are comingled with the fibres and at least some of the polymeric particles are present in-between the fibres of the nonwoven structure. The particles are held in position throughout the nonwoven structure due to the combination of the binder and the mechanical interlocking mechanisms created by the intermingled fibres. FIG. 1 is a schematic illustration of an exemplary hybrid veil, showing cross-sectional view. FIG. 2 is a 3D (three-dimensional) reconstructed image of an actual veil that was formed by a wet-laid process and scanned by Computerized Tomography. The veil shown in FIG. 2 is composed of nonwoven carbon fibres and polyimide particles. Nonwoven specimens measuring 5×5×25 mm in size were scanned at a resolution of 325 nm. 1600 individual 2D X-ray radiographs were captured and reconstructed into a 3D volume. Carbon fibers and particles were then segmented to allow for mapping and identification of the nonwoven architecture.

The hybrid veil may have an areal weight of less than or equal to 12 gsm, for example, 5 gsm to 12 gsm. The weight ratio of fibres to particles in the veil may be 5:1 to 1:1.

The nonwoven fibres making up the hybrid veil may be carbon fibres or thermoplastic fibres, or a combination of different fibres. The carbon fibres may be metal-coated. Metal coating may be of any suitable metal including, but are not limited to, silver, gold, platinum, palladium, nickel, copper, lead, tin, aluminum, titanium, alloys and mixtures thereof.

Thermoplastic fibres include fibres made of polyamides such as aliphatic polyamides (PA), cycloaliphatic polyamides, aromatic polyamides, polyphthalamides (PPA), ether or ester block polyamides (PEBAX, PEBA), polyphenylenesulfides (PPS), polyetherimides (PEI), polyimides (PI), polyimides having phenyltrimethylindane structure, polyamidoamides (PAI), polysulfones, polyarylsulfones such as polyethersulfone (PES), polyethersulfone-etherethersulfone (PES:PEES), polyetherethersulfone (PEES), polyaryletherketone (PAEK) such as polyetherketone (PEK), polyetheretherketone (PEEK), polyurethanes, thermoplastic polyurethanes, polycarbonates, polyacetals, polyphenyleneoxides (PPO), polyesters, polyethers, polyethernitriles, polybenzimidazoles, thermoplastic elastomers, liquid crystal polymers (LCPs), combinations and copolymers thereof.

In some embodiments, the nonwoven fibres in the veil are chopped fibres having lengths in the range of 3 mm to 18 mm. The majority of the nonwoven fibres have cross-sectional diameters in the range of about 3.0 µm to 15 µm, and in some embodiments, ≤5.5 µm in diameter.

When the hybrid veil is incorporated into fibre-reinforced polymer composites, the particles function as an interlaminar toughening material. The particles that are suitable for the purposes disclosed herein include thermoplastic and elastomeric particles, composite particles formed from a mixture of different materials, and core-shell particles. Core-shell particle refer to a particle having a core surrounded by one or more shells.

More specifically, the particles may be particulate form of polymers selected from: aliphatic polyamides (PA), cycloaliphatic polyamides, aromatic polyamides, polyphthalamide (PPA), ether or ester block polyamides (PEBAX, PEBA), polyaryletherketones (PAEK), such as polyetheretherketone (PEEK) and polyetherketoneketone (PEKK), polyphenylene sulfide (PPS), polyamideimide (PAI), polyphenyleneoxides (PPO), polyesters, polyurethanes, thermoplastic polyurethanes, polyethers, polyethernitriles, polybenzimidazoles, thermoplastic elastomers, liquid crystal polymers (LCPs), copolymers thereof, and derivatives thereof. Particularly suitable are particles of polyamide, such as PA-10,10 or microcrystalline PA-12.

In some embodiments, the composition of the polymeric particles contains at least one elastomeric polymer or material selected from: cross-linked polybutadiene, butyl rubber, polyacrylic, polyacrylonitrile, polystyrene, methylmetacrylate, copolymers thereof, and derivatives thereof.

Also, certain grades of polyimide particles may be suitable. For example, polyimides prepared from benzophenone tetracarboxylic acid dianhydride (BTDA), 4,4'-methylenedianiline (MDA), and 2,4-toluenediamine (TDA), and having a non-phthalimide carbon content which contains between 90 and 92 percent aromatic carbons.

Examples of commercially available particles that are suitable include DuoMod DP5045 sold by Zeon Chemicals Inc., P84™ polyimide from HP Polymer Inc., Vestamid® Terra biobased polyamides and Trogamid® CX-grades polyamides from Evonik, PA9T (an aliphatic-aromatic hybrid polyamide) from Kuraray, Japan.

Suitable polymeric particles also include particles of crosslinked thermoplastic polymer such as those described in U.S. Pat. No. 8,846,818 and U.S. Publication No. 2010/0304118, both of which are incorporated herein by reference.

Resin-soluble thermoplastic particles may also be used. Examples include particulate thermoplastic polymers selected from: polyarylsulfones, e.g. polyethersulfone (PES), polyetherethersulfone (PEES), PES-PEES copolymer, polyetherimide (PEI) and polyimides (PI). These resin-soluble thermoplastic particles are solid particles (e.g. powder) at ambient temperature (20° C.-25° C.) but will dissolve in a thermoset resin when the resin is heated, for example, during the curing cycle of the thermoset resin. Consequently, these particles do not remain as discreet particles in the cured resin matrix.

As used herein, "dissolve" in a resin means forming a homogeneous or continuous phase with the resin. "Discrete particle" as used herein refers to a particle which is discernible in a matrix resin, and which may be detected by using Scanning Electron Microscopy (SEM), Optical Microscopy, or Differential Interference Contrast microscopy (DIC).

In other embodiments, the particles are formed from a mixture of polymer(s) and conductive material(s). The polymers are as described above for polymeric particles. The conductive materials may be selected from metals, non-metallic conductive materials, metal-coated materials and combinations thereof, having an electrical conductivity of greater than about $1\times10^3$S/m. Suitable metals include any known metals including, but are not limited to, silver, gold, platinum, palladium, nickel, copper, lead, tin, aluminum, titanium, alloys and mixtures thereof. Suitable non-metallic conductive materials include, but are not limited to, carbon and graphite. The electrical conductivity of the aforementioned conductive materials can be determined using four-point methods or using the eddy current method according to DIN EN 2004-1 and ASTM E 1004. A specific example of this type of particles is the composite particles described in International Publication No. WO 2014/011293, which is incorporated herein by reference.

Also contemplated are particles having a core-shell structure, i.e. a core surrounded by one or more shell(s). Examples include metal coated polymeric core, carbon coated polymeric core, metal coated ceramic core, carbon-coated ceramic core, metal-coated glass spheres, metal-coated hollow glass spheres.

The particles discussed above may be of any three-dimensional shape, including spherical or rod shapes. The particles may have an aspect ratio of less than 5:1, preferably, the aspect ratio is about 1:1. With reference to particles, the term "aspect ratio" refers to the ratio of the largest cross sectional dimension to the smallest cross sectional dimension of the particle.

For spherical particles (with aspect ratio of approximately 1:1), the mean particle size refers to its diameter. For non-spherical particles, the mean particle size refers to the largest cross sectional dimension of the particles.

For the purposes disclosed herein, the particles may have a particle size distribution (d50) of less than 100 μm, particularly, within the range of 10 μm-50 μm, or within the range of 15 μm-35 μm, as measured by a laser diffraction technique, for example, using a Malvern Mastersizer 2000 instrument, which operates in the 0.002 nanometer-2000 micron range. "d50" represents the median of the particle size distribution, or alternatively is the value on the distribution such that 50% of the particles have a particle size of this value or less.

The hybrid veil has a sufficient amount of binder to hold the fibres and polymeric particles together but the binder amount is small enough to leave the resulting veil porous and permeable to fluids (liquid and gas). Through-the-thickness air permeability of the veil can be measured according to a saturated flow experiment at a constant volume flow rate. This method involves recording the pressure drop through a test specimen. The recorded pressure drop is then used to determine the permeability of the specimen using the following pressure drop formula:

$$K3 = \frac{Q\eta h}{\Delta P A}$$

where:
K3=permeability
Q=Volume flow rate
η=Viscosity of the test fluid
h=Thickness of the specimen
ΔP=pressure drop across the specimen
A=cross sectional area of the cylindrical flow channel The pressure transducers, which are mounted on either side of the specimen, record the pressure drop of the test fluid, which is identical to the fluid used for the in-plane experiment. A National Instruments LabVIEW™ program can be used to acquire and evaluate the experimental data to produce a permeability value for this through-thickness data.

The amount of binder in the veil may be from about 2% to about 30% by weight, in some embodiments, about 5% to about 25% by weight, in other embodiments, about 10% to about 20% by weight, based on the total weight of the veil. The binder may be a thermoplastic, thermosetting or elastomeric binder. Suitable binders include vinyls such as poly vinyl alcohol (PVA), poly ethylene vinyl alcohol (PEVOH), poly vinyl acetate, poly vinyl ether, poly vinyl chloride (PVC) and poly vinyl ester, butadienes such as poly styrene butadiene and polybutadiene acrylonitrile, silicones, polyesters, co-polyesters, polyamides, co-polyamides, cross-linked polyesters, acrylics such as styrene acrylics and acrylonitrile acrylics, epoxies, phenoxies, phenolics, polyurethanes, phenol-formaldehyde- or urea-formaldehyde resins, combinations and copolymers thereof. Examples of commercially available binders include Acronal® 888 and Acrodur® 950 acrylic binders from BASF, Baybond® PU330 and XP2569 from Bayer, Vinamul® 8828 from Celanese Corp., Filco® 309 from COIM.

The hybrid veil discussed herein may be produced by a conventional wet-laid process, as an example. In a wet-laid process, chopped fibres and polymeric particles are dispersed in aqueous slurry which may contain a binder, and optionally, additives such as surfactant(s), viscosity modifier(s), defoaming agent(s), drainage aids and/or other chemical agents. The specific additives are selected to achieve a stable dispersion of fibres in water for the duration of the wet-laid manufacturing process. Once the chopped fibres are introduced into the slurry, the slurry is intensely agitated so that the fibres become dispersed. The slurry containing the fibres and particles is then deposited onto a moving screen where a substantial portion of the water is removed to form a sheet. Subsequently, the liquid may be removed from the sheet by vacuum and/or hot air drying. When both liquid removal methods are used, it is preferred that hot air drying is applied later as it may be used to melt or cure the binder. Such wet-laid processes are typically used when a uniform distribution of fibres and/or weight is desired.

The median of the thickness of the hybrid veil after being subjected to a pressure of 1 bar is preferably 80 μm as measured using a dead weight micrometer. In some embodiments, the ratio between the veil thickness in microns after being subjected to 1 bar pressure and the veil areal weight (A/W) in gsm is less than 10.

The median thickness of the veil as discussed herein can be determined by measuring 25 samples on a square pattern: five down and five across on a veil sample of 300 mm×300 mm.

Composite Laminates

The hybrid veil described above may be used as an interlayer or interleaf in a composite laminate. In one embodiment, the composite laminate is a layup of prepregs arranged in a stacking arrangement and at least one hybrid veil is inserted or interleaved between two adjacent prepreg plies. In a preferred embodiment, there is a plurality of hybrid veils interleaving the prepreg layup with each veil interposed between adjacent prepreg plies.

The term "prepreg" as used herein refers to a layer of reinforcement fibres that has been pre-impregnated with a curable matrix resin within at least a portion of the fibrous volume. The matrix resin impregnating the reinforcement fibres may be in a partially cured or uncured state. The prepreg is a pliable or flexible material that is ready for laying up and shaping into a three-dimensional configuration, followed by curing into a final composite part. Consolidation by applying pressure (with or without heat) may be carried out prior to curing to prevent the formation of voids within the layup. This type of prepregs is particularly suitable for manufacturing load-bearing structural parts, such as wings, fuselages, bulkheads and control surfaces of aircrafts. Important properties of the cured prepregs are high strength and stiffness with reduced weight.

The term "impregnate" as used herein refers to the introduction of a curable matrix resin material to reinforcement fibres so as to partially or fully encapsulate the fibres with the resin. The matrix resin for making prepregs may take the form of resin films or liquids. Moreover, the matrix resin is in a curable or uncured state prior to bonding. Impregnation may be facilitated by the application heat and/or pressure.

The layer of reinforcement fibres in the prepreg may be in the form of continuous, unidirectionally-aligned (or "unidirectional") fibres or tows, woven fabric, or nonwoven multiaxial fabric (e.g. non-crimped fabric or NCF). Continuous tows are made up of multiple fibre filaments, for example, 3000-24,000 filaments.

The reinforcement fibres may be made of materials selected from, but are not limited to, glass (including Electrical or E-glass), carbon (including graphite), aramid, polyamide, high-modulus polyethylene (PE), polyester, poly-p-phenylene-benzoxazole (PBO), boron, quartz, basalt, ceramic, and combinations thereof. For the fabrication of high-strength composite materials, e.g., materials for aerospace and automotive applications, it is preferred that the reinforcing fibres have the tensile strength of greater than 500 ksi (or 3447 MPa) as measured according to ASTM C1557-14.

As an example, the impregnating method for making the prepregs may include:

(1) Continuously moving continuous, unidirectional fibres or fabric web through a (heated) bath of molten impregnating matrix resin composition to fully or substantially fully wet out the fibres; or (2) Hot-melt process that includes pressing a resin film against at least one side of continuous, unidirectional fibres or a fabric web, and applying heat to melt the resin film.

In a preferred embodiment, the reinforcement fibres in the prepregs are continuous unidirectional carbon or graphite fibres, lying in the same plane. The prepregs within the layup may be positioned in a selected orientation with respect to one another. For example, the prepreg layup may include prepregs having unidirectional fibres oriented at a selected angle θ, such as 0°, 45°, or 90°, with respect to the length of the layup.

Upon consolidation and curing of the prepreg layup, the matrix resin in the prepregs penetrates through the voids or gaps in the interleaving, porous veil(s), resulting in an integrated composite structure. Consolidation refers to a process that takes place under the action of one or more of heating, vacuuming, and applied pressure, whereby the matrix resin flows so as to displace void spaces. For example, consolidation may result in, but is not limited to, flow of resin into void spaces between fibers in the prepreg, void spaces between prepregs, and the like. Consolidation and curing may be performed in a single stage or separately.

During the curing process, the veil architecture prevents the infiltration of the toughening particles into the structural layers of reinforcement fibres. In this way, a high concentration of toughening particles is created in the interlaminar region between the structural layers, and a constant and controlled plastic deformation zone at the propagating crack front is achieved for the cured composite structure. The architecture of the hybrid veil confines the plastic deformation zone to the interlaminar boundaries and therefore the crack does not appear in the interfaces between the interlayer and the reinforcement fibres. Consequently, higher values in Mode I and II interlaminar fracture toughness and CSAI can be achieved.

Moreover, as the particles are chemically and mechanically confined in the nonwoven veil, the particles cannot be squeezed into the reinforcement fibre bundles, thus, the creation of undulated regions can be avoided. Such undulated regions are normally responsible for the reduction in the composite compressive strength properties.

In some embodiments, the median thickness of the interlaminar region created by the hybrid veil in a cured composite structure formed from a prepreg layup is less than 60 μm. The median thickness is determined by taking measurements at different locations and calculating the average value.

FIGS. 3A and 3B schematically illustrate a cured composite laminate containing the hybrid veil in the interlaminar region in comparison to a similar cured composite laminate containing a nonwoven veil with toughening particles scattered onto the veil's surface. The composite laminate in FIG. 3B contains an uncontrolled, undulated interlaminar region with a particle-deficient section. In contrast, the composite laminate in FIG. 3A contains a well-controlled interlaminar region due to the confinement of the particles in the veil.

In addition, when the veil is consisting of conductive fibres (e.g. carbon fibres) and the polymeric toughening particles are uniformly distributed throughout the nonwoven structure of the veil, the bulk conductivity of the cured composite laminate can be either maintained or improved.

It has been found that the incorporation of the hybrid veil in composite structures is an effective solution to the corner thinning problem normally observed in composite parts with L, U or Z shaped sections. FIGS. 4A and 4B schematically illustrate the forces acting on a composite laminate over a concave molding surface and a convex molding surface, respectively, during the cure cycle of the composite in an autoclave or out-of-autoclave vacuum-bag set-up.

Referring to FIG. 4A, in a concave corner, the tool surface (S$_T$) is larger than the bag surface (S$_P$). Referring to FIG. 4B, in a convex corner, the tool surface (S$_T$) is smaller than the bag surface (S$_P$). The bag surface is always exposed to 1 atm of pressure (P). To satisfy the balance of forces, the reaction pressure from the tool in a concave corner is less than 1 atm (P−ΔP), whereas the reaction pressure from the tool in a convex corner is more than 1 atm (P+ΔP). "T" refers to the tensile longitudinal stress and <P refers to a lower compaction pressure. Consequently, concave corners are usually subject to corner thickening, and convex corners usually exhibit corner thinning.

The substantially uniform distribution of toughening particles in the hybrid veil at the interlaminar regions of a composite laminate can substantially reduce or eliminate the occurrence of the thinning phenomenon without reducing the curved beam strength, which is a measurement of the momentum per unit width which causes a delamination to form.

Preform Configured for Resin Infusion

In another embodiment, one or more of the hybrid veil disclosed herein is/are used as interlayer(s)/interleaf(s) in a preform configured for receiving liquid resin via resin infusion process such as RTM and VaRTM. The preform consists of multiple layers of dry reinforcement fibres with one or more hybrid veils interposed between adjacent layers of dry reinforcement fibres.

With the use of the hybrid veil, the aforementioned issues associated with adding toughening agents to the liquid resin systems for RTM and VaRTM applications can be avoided.

The layers of reinforcement fibres in the preform may be any type of textiles known in the prior art for manufacturing composite materials. Examples of suitable fabric types or configurations include, but are not limited to: all woven fabrics, examples are plain weave, twill weave, sateen weave, spiral weave, and uni-weave; all multiaxial fabrics, examples of which include, warp-knitted fabrics, and non-crimp fabrics (NCF); knitted fabrics; braided fabrics; all non-woven fabrics, examples of which include, but are not limited to, mat fabrics composed of chopped and/or continuous fibre filaments, felts, and combinations of the aforementioned fabric types. The reinforcement fibres in the preform are made of materials disclosed above in reference to prepregs. In preferred embodiments, at least some of the fibre layers in the preform are composed of carbon or graphite fibres.

The mold for liquid resin infusion may be a two-component, closed mold or a vacuum bag sealed, single-sided mold. The use of two-component, closed mold is well known and is described in, for example, U.S. Pat. No. 4,891,176. The use of vacuum bag sealed, single-sided mold is also known, see for example, U.S. Pat. Nos. 4,942,013, 4,902,215, 6,257,858, and 8,652,371.

Prior to resin infusion, the dry fibre preform may be stabilized by dispersing a small amount of polymeric binder between adjacent layers of the preform and then shaped into the desired configuration. A suitable binder for stabilization is that the thermoplastic-epoxy binder disclosed in U.S. Pat. No. 8,927,662, the content of which is incorporated herein by reference in its entirety.

The hybrid veil disclosed herein may be attached to a fabric ply to form a modified fabric that may be used to form a preform that can be infused with a liquid resin infusion via resin infusion processes such as RTM and VaRTM. The attachment of the veil to the fabric may be carried out by either a stitching or knitting yarn or by pure melting and consolidation of a binder in between the veil and the fabric. In one embodiment, one or more hybrid veil(s) is/are incorporated into a multiaxial, non-crimped fabric (NCF). NCF consists of non-crimped fibre-layers, which are connected by stitching yarns. Each fibre layer in the NCF consists of continuous unidirectional fibres that are oriented in a direction different from the fibres in another fibre layer. One or more hybrid veil(s) may be interleaved between adjacent fibre layers to form a modified NCF, which may be used to form the preform for resin infusion application.

Figure 6:
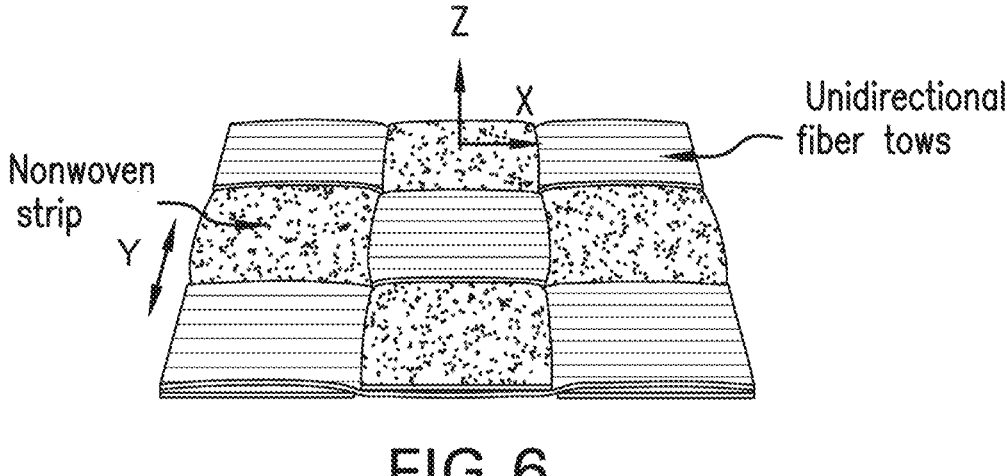
FIG. 6 schematically illustrates a woven fabric according to an embodiment of the present disclosure.

In another embodiment, the hybrid veil is slit into narrow strips which are woven with unidirectional fiber tows in a weaving pattern to form a woven fabric as illustrated in FIG. 6. This fabric is permeable of liquid and may be used to form a preform that can be infused with liquid resin via resin infusion processes such as RTM and VaRTM.

In some embodiments, the median thickness of the interlaminar region created by the hybrid veil in a cured composite structure formed from a resin-infused preform is less than 80 μm, or less than 60 μm. The median thickness is determined by taking measurements at different locations and calculating the average value.

Prepregs

Figure 5A:
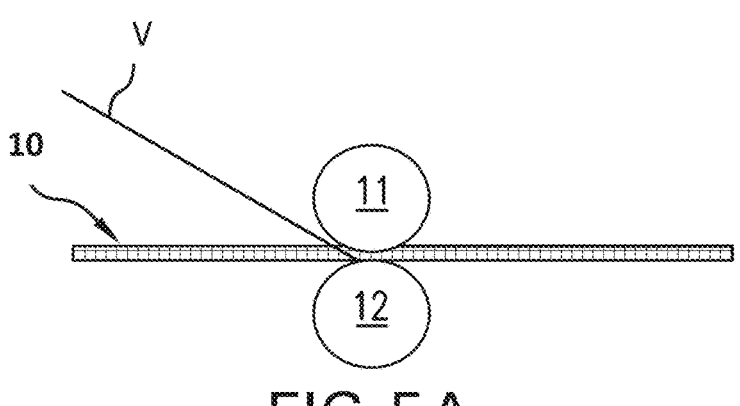
FIGS. 5A-5D shows various embodiments for manufacturing a modified prepreg with hybrid veil(s) integrated therein.

In one embodiment, the hybrid veil is laminated directly onto one or both surfaces of an existing prepreg by applying heat and pressure to form a modified prepreg with veil(s) integrated therein. FIG. 5A illustrates an example of this embodiment. The hybrid veil V is pressed against a moving, continuous prepreg 10 with the aid of a pair of upper and lower pressure nip rollers 11 and 12. Heat can also be applied to the prepreg and veil via the pressure nip rollers 11 and 12. The initial prepreg 10 is composed of a layer of reinforcement fibers (e.g. unidirectional carbon fibers) that has been pre-impregnated or infused with a curable resin.

Figure 5B:
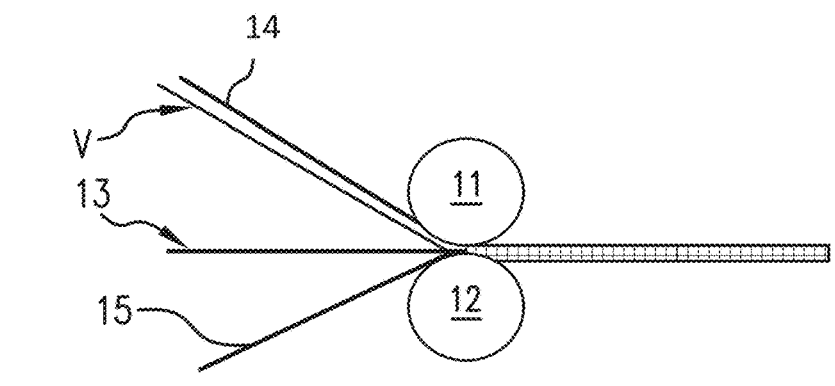

In another embodiment, the hybrid veil is integrated into the prepreg during the manufacturing of the prepreg. First, a resin is coated on a release paper to obtain a thin resin film. The hybrid veil is then combined with the resin film and a layer of reinforcing fibers by sandwiching the veil between the layer of reinforcing fibres and the resin film, and then applying heat and pressure to the combined layers. FIG. 5B illustrates an example of this embodiment. A layer of continuous reinforcing fibers 13 (referred hereafter as "fibre layer") is sandwiched between an upper resin film 14 and a lower resin film 15, and a hybrid veil V is inserted between the upper resin film 14 and the fibre layer 13. Each of the resin films 14 and 15 may be supported by a release paper, which is positioned as the outermost layer in the arrangement shown in FIG. 5B. Heat and pressure are applied by the rollers 11 and 12 to the combined layers to form a resin-impregnated prepreg having a hybrid veil embedded therein. Optionally, a second hybrid veil may be inserted between the fiber layer 13 and the lower resin film 15 prior to the application of heat and pressure.

Figure 5C:
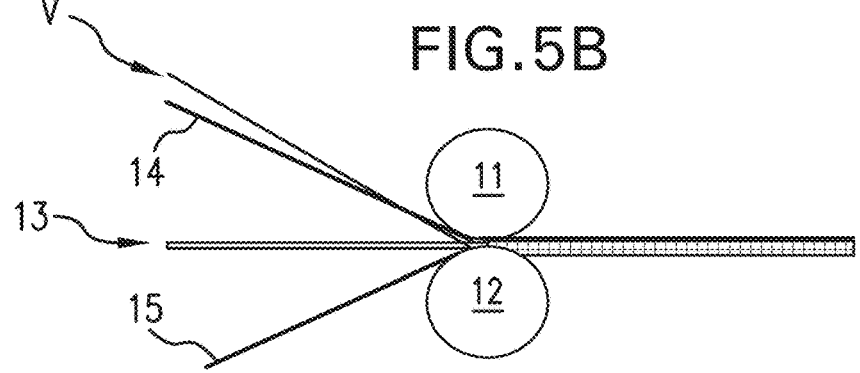

FIG. 5C shows another embodiment which is similar to that shown in FIG. 5B but the hybrid veil V comes into contact with an outer surface of the upper resin film 14 such that the resin film 14 is between the veil V and the fibre layer 13. In this arrangement, the release paper supporting the upper resin film 14 is removed before it comes into contact with the veil V.

Figure 5D:
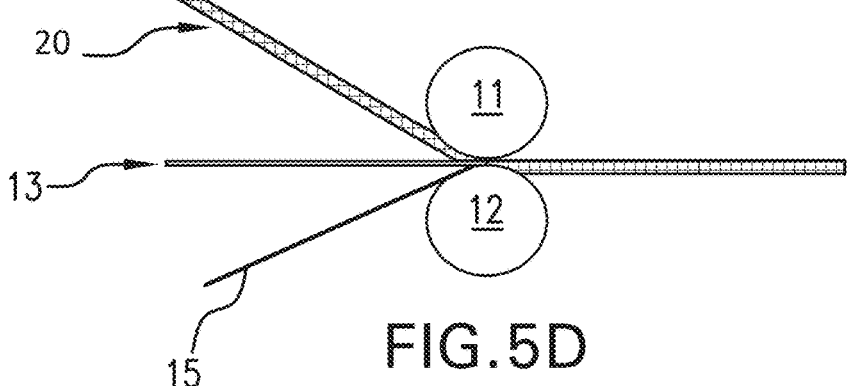

In yet another embodiment, the hybrid veil is impregnated with a curable resin composition to produce a resin-impregnated hybrid veil. Then, the pre-impregnated veil is combined with a fibre layer using heat and pressure to form a prepreg with the veil integrated therein. FIG. 5D illustrates an example of this embodiment. The continuous fibre layer 13 is sandwiched between a pre-impregnated veil 20 and the lower resin film 15. Heat and pressure are applied to the combined layers by rollers 11 and 12 to consolidate the layers. Alternatively, the lower resin film 15 is replaced with a second pre-impregnated veil.

ATL/AFP Tapes

The hybrid veil disclosed herein may be incorporated into continuous prepreg tapes suitable for use in an Automated Tape Laying (ATL) or Automated Fibre Placement (AFP) process. In one embodiment, a prepreg having one or more hybrid veil(s) incorporated therein is formed as described above, and then slit into narrow tapes with suitable ATL width (e.g. 6 in-12 in or 152 mm-305 mm) or AFP width (e.g., 0.125 in-1.5 in or 3.17 mm-38.1 mm, including 0.25 in-0.50 in or 6.35 mm-12.77 mm). The tapes may have a continuous length that is at least ten times its width.

ATL and AFP are processes that use computer-guided robotics to lay down successive layers of prepreg tapes onto a mold surface (e.g. a mandrel) to create a composite structure. Exemplary applications include aircraft wing skins and fuselages. The ATL/AFP process involves dispensing one or more tapes side by side onto a mandrel surface to create a layer of desired width and length, and then additional layers are built up onto a prior layer to provide a layup with a desired thickness. The ATL/AFP system may be equipped with means for dispensing and compacting prepreg tapes directly onto the mandrel surface.

AFP automatically places multiple individual pre-impregnated tows or narrow slit tapes (e.g., 0.125 in-1.5 in) onto a mandrel to make up a given total prepreg bandwidth. The material placement is done at high speed, using a numerically controlled placement head to dispense, clamp, cut and restart each tow during placement. ATL machine lays down prepreg unidirectional tapes or continuous strips of fabric, which are wider than the single tows or slit tape used in AFP. Typically, with both processes, material is applied via a robotically controlled head, which contains mechanism needed for material placement. AFP is traditionally used on very complex surfaces and smaller In another embodiment, the hybrid veil is combined with unidirectional reinforcement fibres to form dry fibrous tapes that are suitable for use in ATL and AFP processes. In this case, the dry fibrous tapes are laid down via ATL or AFP to form a preform that is configured for liquid resin infusion processes such as RTM and VaRTM.

To form the dry fibrous tapes, a hybrid veil is laminated to a layer of continuous, unidirectional reinforcement fibres, e.g. carbon fibres, with the aid of a binder, which may be in powder form or liquid form. Optionally, the laminated structure is further exposed to a second binder in liquid form in order to improve the fraying resistance of the binder-treated fibrous material during slitting. The binder-treated material is then slit into narrow-width tapes that are suitable for ATL or AFP processes.

According to one embodiment, the method for manufacturing the dry tape includes: applying a first binder, in powder form or liquid form, to a dry fibre web of continuous, unidirectional reinforcement fibres (e.g. carbon fibres);

bonding a hybrid veil to at least one side of the fibre web to form a fibrous laminate; applying a second binder, in the form of a liquid composition, to the fibrous laminate, e.g. by dip coating; and drying the binder-treated laminate, for example, in an oven. Alternatively, the first binder is applied to the veil and the veil is then bonded to the unidirectional fibres. The dried, binder-treated laminate is then slit into narrow-width tapes that are suitable for ATL/AFP, and optionally, the slit tapes are wound onto spools.

The presence of the second liquid binder in addition to the first binder can prevent fraying of the tapes during slitting as well as create low-bulk tapes. Such "low-bulk" property is desirable because the preform formed by the dry fibrous tapes exhibits a low-bulk property upon heating as determined by the heating and forming process of the automated placement process, and by the cured thickness of the composite structure after resin infusion and curing. Consequently, debulking of the preform prior to curing is minimal (or not necessary at all) because debulking occurs during the ATL/AFP process as the binder-treated tapes are being laid down to form the preform.

Suitable binder materials for forming the dry fibrous tapes may be selected from:

i. a binder that is a solid at a temperature of up to 50° C., has a softening point at a temperature in the range of 75° C. to 125° C. as measured by DSC, and is formed of a blend of epoxy resin and thermoplastic polymer, but is void of any catalyst or cross-linking agent which is active above 75° C.;

ii. a composition comprising at least one multifunctional epoxy resin; at least one thermoplastic polymer; and at least one surfactant selected from anionic surfactants and nonionic surfactants;

iii. partially or fully cross-linked copolymer of polyhydroxyether and polyurethane;

iv. polyurethane, which is non-crosslinked, partially or fully crosslinked, or modified polyurethane polymer;

v. epoxy, which is non-crosslinked, partially or fully crosslinked, or modified epoxy; and vi. poly(hydroxyether) resin, which is non-crosslinked, partially or fully crosslinked.

A particularly suitable binder is the thermoplast-epoxy binder described in U.S. Pat. No. 8,927,662, the content of which is incorporated herein by reference in its entirety. This thermoplast-epoxy binder can be applied in powder form. Another particularly suitable binder is the liquid binder composition described in U.S. Publication No. 2014/0179187, the content of which is incorporated herein by reference in its entirety. Either of these binders can be applied to the veil or unidirectional reinforcement fibres as the only binder or as the first of two different binders.

A liquid binder that may be used in the fabrication of the dry fibrous tape is the liquid binder composition containing polyhydroxyether-polyurethane copolymer described in U.S. Publication No. 2014/0370237, the content of which is incorporated herein by reference in its entirety. Other suitable liquid binders may be selected from water-borne dispersions containing one of: polyurethane, modified polyurethane polymer, epoxy resin, and poly(hydroxyether) resin. Optionally, a cross-linker is included in these water-borne dispersions. Suitable liquid binders may those disclosed in U.S. Publication No. 2015/0375461.

The total amount of binder materials in the dry fibrous tape (including the binder in the veil) is about 15% or less by weight, e.g. about 0.1 to about 15% by weight, based on the total weight of the dry tape. The total amount of binder(s)

is sufficiently small such that the binder-treated fibrous tapes remain porous and permeable to the liquid resin used in resin infusion processes.

Matrix Resin

The curable matrix resin for impregnating or infusing the reinforcement fibres and preforms discussed above is preferably a hardenable or thermoset resin containing one or more uncured thermoset resins, which include, but are not limited to, epoxy resins, imides (such as polyimide or bismaleimide), vinyl ester resins, cyanate ester resins, isocyanate modified epoxy resins, phenolic resins, furanic resins, benzoxazines, formaldehyde condensate resins (such as with urea, melamine or phenol), polyesters, acrylics, hybrids, blends and combinations thereof.

Suitable epoxy resins include polyglycidyl derivatives of aromatic diamine, aromatic mono primary amines, aminophenols, polyhydric phenols, polyhydric alcohols, polycarboxylic acids. Examples of suitable epoxy resins include polyglycidyl ethers of the bisphenols such as bisphenol A, bisphenol F, bisphenol S and bisphenol K; and polyglycidyl ethers of cresol and phenol based novolacs.

Specific examples are tetraglycidyl derivatives of 4,4'-diaminodiphenylmethane (TGDDM), resorcinol diglycidyl ether, triglycidyl-p-aminophenol, triglycidyl-m-aminophenol, bromobisphenol F diglycidyl ether, tetraglycidyl derivatives of diaminodiphenylmethane, trihydroxyphenyl methane triglycidyl ether, polyglycidylether of phenol-formaldehyde novolac, polyglycidylether of o-cresol novolac or tetraglycidyl ether of tetraphenylethane.

Commercially available epoxy resins suitable for use in the the host matrix resin include N,N,N',N'-tetraglycidyl diamino diphenylmethane (e.g. MY 9663, MY 720, and MY 721 from Huntsman); N,N,N',N'-tetraglycidyl-bis(4-amino-phenyl)-1,4-diiso-propylbenzene (e.g. EPON 1071 from Momentive); N,N,N',N'-tetraclycidyl-bis(4-amino-3,5-dimethylphenyl)-1,4-diisopropylbenzene, (e.g. EPON 1072 from Momentive); triglycidyl ethers of p-aminophenol (e.g. MY 0510 from Hunstman); triglycidyl ethers of m-aminophenol (e.g. MY 0610 from Hunstman); diglycidyl ethers of bisphenol A based materials such as 2,2-bis(4,4'-dihydroxy phenyl) propane (e.g. DER 661 from Dow, or EPON 828 from Momentive, and Novolac resins preferably of viscosity 8-20 Pas at 25° C.; glycidyl ethers of phenol Novolac resins (e.g. DEN 431 or DEN 438 from Dow); di-cyclopentadiene-based phenolic novolac (e.g. Tactix 556 from Huntsman); diglycidyl 1,2-phthalate (e.g. GLY CEL A-100); diglycidyl derivative of dihydroxy diphenyl methane (Bisphenol F) (e.g. PY 306 from Huntsman). Other epoxy resins include cycloaliphatics such as 3',4'-epoxycyclohexyl-3,4-epoxycyclohexane carboxylate (e.g. CY 179 from Huntsman).

Generally, the curable matrix resin contains one or more thermoset resins in combination with other additives such as curing agents, curing catalysts, co-monomers, rheology control agents, tackifiers, inorganic or organic fillers, thermoplastic and/or elastomeric polymers as toughening agents, stabilizers, inhibitors, pigments, dyes, flame retardants, reactive diluents, and other additives well known to those skilled in the art for modifying the properties of the matrix resin before and/or after curing. However, optional additives that can be added to the resin for liquid resin infusion are limited by the low-viscosity requirement and filtering effect discussed above.

If present, toughening agents for the curable matrix resin may include, but are not limited to, homopolymers or copolymers either alone or in combination of polyamides, copolyamides, polyimides, aramids, polyketones, polyetherimides (PEI), polyetherketones (PEK), polyetherketoneketone (PEKK), polyetheretherketones (PEEK), polyethersulfones (PES), polyetherethersulfones (PEES), polyesters, polyurethanes, polysulphones, polysulphides, polyphenylene oxide (PPO) and modified PPO, poly(ethylene oxide) (PEO) and polypropylene oxide, polystyrenes, polybutadienes, polyacrylates, polymethacrylates, polyacrylics, polyphenylsulfone, high performance hydrocarbon polymers, liquid crystal polymers, elastomers and segmented elastomers.

The addition of curing agent(s) and/or catalyst(s) in the curable matrix resin is optional, but the use of such may increase the cure rate and/or reduce the cure temperatures, if desired. The curing agent is suitably selected from known curing agents, for example, aromatic or aliphatic amines, or guanidine derivatives. An aromatic amine curing agent is preferred, preferably an aromatic amine having at least two amino groups per molecule, and particularly preferable are diaminodiphenyl sulphones, for instance where the amino groups are in the meta- or in the para-positions with respect to the sulphone group. Particular examples are 3,3'- and 4-,4'-diaminodiphenylsulphone (DDS); methylenedianiline; bis(4-amino-3,5-dimethylphenyl)-1,4-diisopropylbenzene; bis(4-aminophenyl)-1,4-diisopropylbenzene; 4,4'methylen-ebis-(2,6-diethyl)-aniline (MDEA from Lonza); 4,4'methyl-enebis-(3-chloro, 2,6-diethyl)-aniline (MCDEA from Lonza); 4,4'methylenebis-(2,6-diisopropyl)-aniline (M-DIPA from Lonza); 3,5-diethyl toluene-2,4/2,6-diamine (D-ETDA 80 from Lonza); 4,4'methylenebis-(2-isopropyl-6-methyl)-aniline (M-MIPA from Lonza); 4-chlorophenyl-N, N-dimethyl-urea (e.g. Monuron); 3,4-dichlorophenyl-N, N-dimethyl-urea (e.g. DIURON™) and dicyanodiamide (e.g. AMICURE™ CG 1200 from Pacific Anchor Chemical).

Suitable curing agents also include anhydrides, particularly polycarboxylic anhydrides, such as nadic anhydride, methylnadic anhydride, phthalic anhydride, tetrahydrophthalic anhydride, hexahydrophthalic anhydride, methyltetrahydrophthalic anhydride, endomethylene-tetrahydrophtalic anhydride, and trimellitic anhydride.

"Curing" or "cure" in the present disclosure refers to the hardening of a polymeric material by the chemical cross-linking of the polymer chains. The term "curable" in reference to composition means that the composition is capable of being subjected to conditions which will render the composition to a hardened or thermoset state.

The term "about" as used in the present disclosure represents an amount close to the stated amount that still performs a desired function or achieves a desired result. For example, the term "about" may refer to an amount that is within less than 1% of the stated amount.

EXAMPLES

Materials

PY306 refers to Araldite® PY 306, a Bisphenol F diglycidyl ether resin from Huntsman. MY0510 refers to Araldite® MY 0510, a triglycidyl ether of p-aminophenol resin from Huntsman, and SUMIKAEXCEL 5003P refers to a polyethersulfone polymer from Sumitomo Chemical Co. 4,4' DDS refers to 4,4'-diaminodiphenylsulphone.

PA-10,10 (polyamide) particles are supplied by Evonik under the trademark Vestamid® Terra 9161, a polycondensation product of 1,10-decamethylenediamine (D) and 1,10-decanedicarboxylic acid (sebacic acid, S), with a Tg of 37° C., melting peak at 206° C. Average particle size (d50) of approximately 26 μm.

P84G is a 70:30 blend of polyimide (P84 325 mesh) and P84 polyimide-coated graphite (70% graphite: 30% P84, by weight), supplied by HP Polymer Inc.; average particle size (d50) of 22 μm.

PILT refers to swellable particles of cross-linked PES-PEES copolymer, which were made according to the method described in U.S. Pat. No. 8,846,818, having an average particle size (d50) of 34 μm.

PA9T is a thermoplastic polyamide available from Kuraray, Japan, synthetized by solid phase polycondensation of terephthalic acid, 1,9 nonanediamine and 2-methyl-1,8 octanediamine, having a Tg of 120-130° C., two melting points at 260° C. and 271° C., and a crystallization temperature above 200° C. The polymer was spun into fibres and the resulting product was chopped up into fibers of desired lengths.

CX7323 refers to Trogamid® CX7323 from Evonik, a semi-aromatic/aliphatic amorphous polyamide synthetized by polycondensation of cycloaliphatic diamines and dodecanedioic acid with a Tg of 140° C., a melting temperature of 260° C., and an average particle size (d50) of 13 μm.

All particle size distributions disclosed in the Examples were measured by a Malvern Mastersizer 2000.

Example 1

Five different resin compositions were prepared according to the formulations disclosed in Table 1. All amounts are in weight by weight (w/w) percentages.

TABLE 1

| | Resin codes | | | | |
|---|---|---|---|---|---|
| Composition | R1 | R2 | R3 | R4 | R5 |
| PY306 | 26.74 | 25.40 | 24.07 | 25.40 | 24.07 |
| MY0510 | 26.74 | 25.40 | 24.07 | 25.40 | 24.07 |
| Sumikaexcel 5003P | 19.44 | 18.47 | 17.50 | 18.47 | 17.50 |
| 4,4' DDS | 27.08 | 25.73 | 24.37 | 25.73 | 24.37 |
| PA-10,10 particles | — | 5.00 | 10.00 | — | — |
| P84G particles | — | — | — | 5.00 | 10.00 |

R1 is a homogeneously toughened baseline resin system without interlaminar particles, and the other four modified versions of R1 contain P84G or PA10,10 particles at 5% and 10% w/w.

The resin compositions were then used to produce different unidirectional (UD) prepregs using a hot melt impregnation process. Resin films were produced by coating the resin composition onto a release paper. Next, two of such resin films were laminated onto opposite sides of a continuous layer of unidirectional carbon fibres (TENAX®—E IMS65 E23 24K 830tex from Toho Tenax, Germany), under the aid of heat and pressure, to form a prepreg. The fibre areal weight (FAW) in gsm (or g/m$^2$) and resin content in weight percentage of the fabricated prepregs are shown in Table 2.

TABLE 2

| Prepreg Codes | Resin Codes | Fibre type | FAW (gsm) | Resin Content (%) |
|---|---|---|---|---|
| P1 | R1 | IMS65-E23- | 190.93 | 35.27 |
| P2 | R2 | 24K | 191.73 | 35.06 |
| P3 | R3 | carbon fibres | 190.56 | 34.46 |

TABLE 2-continued

| Prepreg Codes | Resin Codes | Fibre type | FAW (gsm) | Resin Content (%) |
|---|---|---|---|---|
| P4 | R4 | | 192.23 | 33.49 |
| P5 | R5 | | 192.33 | 34.40 |

Hybrid veils of different areal weights were manufactured by using a wet-laid or paper-making process. Chopped, intermediate modulus (IM) carbon fibres (IM7G 12K from Hexcel) with diameter of approximately 5.2 μm and selected thermoplastic particles were used to form the hybrid veils. Table 3 provides a summary of the veil composition, thermoplastic particle content, carbon fibre content, and veil areal weight. In Table 3, IM7 refers to IM7G carbon fibres.

TABLE 3

| Veil code | Composition | Thermoplastic particle content (gsm) | Carbon fibre content (gsm) | Areal weight (gsm) |
|---|---|---|---|---|
| V1 | P84G/IM7 | 1.88 (P84G) | ~5.0 | 9.1 |
| V2 | PA10,10/IM7 | 1.83 (PA-10,10) | ~5.0 | 8.43 |
| V3 | PILT/IM7 | 2.4 (PILT) | ~5.0 | 9.9 |
| V4 | PILT/IM7/PA9T | 1.7 (PILT) | ~5.0 | 7.7 |
| V5 | CX7323/IM7 | 0.5 (CX7323) | ~5.0 | 6.4 |

To form each of the veils, a mixture of chopped fibres and thermoplastic particles were first suspended in water then the slurry was deposited onto a porous screen to remove the water, resulting in the formation of a nonwoven web, and the nonwoven web was then stabilized by applying a liquid styrene acrylic binder (Acronal® 888 from Basf) and drying the nonwoven product in an oven to evaporate any remaining water and to cross-link the binder. The resulting product, which was characterized by structural integrity in both machine (MD) and crossweb (CD) directions, was wound into rolls.

Figure 7:
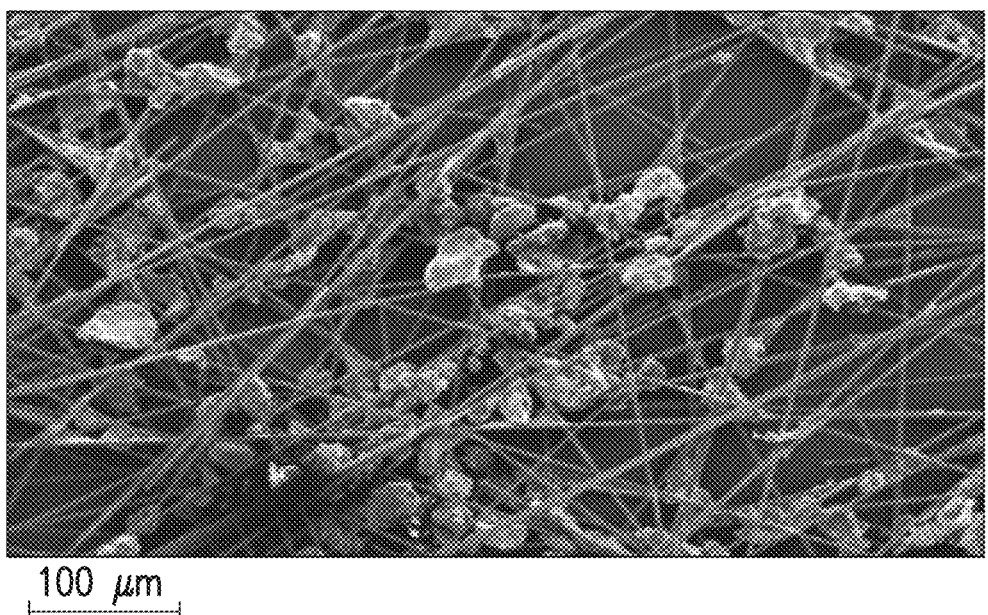
FIG. 7 shows a top-view image of an exemplary hybrid veil taken by Scanning Electron Microscopy (SEM).

FIG. 7 shows a top-view image of the V1 hybrid veil (P84G/IM7) taken by scanning electron microscope (SEM). Particles are shown as being intermingled with the carbon fibres and substantially uniformly distributed throughout the veil structure. The thermoplastic particles are present through the thickness of the veil. Many particles are collected at the intersections of multiple fibres within the veil structure, trapped in binder "pools" and simply held in position by the veil architecture.

Example 2

Mechanical Characterization—UD Prepregs

Composite panels were made by laying up the prepregs (P1, P2, P3) disclosed in Table 2. Each panel was comprised of a specific number of prepreg plies oriented according to the lay-up configuration reported in Table 4. P1 prepreg layups were also interleaved with the different hybrid veils disclosed in Table 3, followed by consolidation and curing in autoclave at 180° C. for 2 hours and at a pressure of 85 psi. For comparison purposes, the same P1 prepreg layup was interleaved with 4 gsm IM7G carbon veils. A variety of mechanical properties were measured to evaluate the effects of the veil architecture and composition on the laminate performance. Tests were performed in accordance with the test methods reported in Table 4.

TABLE 4

| Property | Testing conditions | Lay-up configuration | Unit measured | Standard Test |
|---|---|---|---|---|
| CAI - 270 in-lbs | RT | [+/0/−/90]3 s | Ksi | ASTMD7136 |
| $G_{Ic}$ - DCB | RT | [0]20 | in-lb/in2 | ASTM-D5528 |
| $G_{IIc}$ - ENF | RT | [0]20 | in-lb/in | |

RT refers to room temperature (25° C.). DCB refers to Double Cantilever Beam and ENF refers to End Notched Flexure.

The CAI, $G_{Ic}$ and $G_{IIc}$ results are reported in Tables 5 to 7. σ denotes the standard variation.

TABLE 5

| Prepreg code | Particle content in prepreg (w/w) | Veil Description | Particle content in veil (w/w) | CAI (MPa) | σ | Damaged Area (mm$^2$) |
|---|---|---|---|---|---|---|
| P1 Baseline | No Particles | NO VEIL | — | 209.1 | 11.1 | 1400 |
| P2 | 5 | NO VEIL | — | 233.3 | 9.7 | — |
| P3 | 10 | NO VEIL | — | 249.7 | 6.5 | — |
| P1 Baseline | No Particles | IM7 (4 gsm) | — | 259.3 | 12.3 | 1000 |
| | | PA10,10/IM7 [V2] (10 gsm) | 1.83 | 285.1 | 9.1 | 898 |
| | | P84G/IM7 [V1] (9 gsm) | 1.88 | 310.2 | 6.5 | 779 |
| | | PILT/IM7 [V3] (9.9 gsm) | 2.4 | 285 | 10.4 | 867 |
| | | CX7323/IM7 [V5] (6.4 gsm) | 0.5 | 277.5 | 11.5 | 515 |
| | | PILT/PA9T/IM7 [V4] (7.7 gsm) | 1.7 | 303.9 | 3.03 | 827 |

As shown in Table 5, the use of hybrid veils as interleafs for unidirectional prepregs can produce up to a 50% improvement in the compression strength after a 30 J impact as compared to the laminates produced from baseline prepregs (P1).

Notably, the homogeneous distribution of small quantities (1.83 gsm) of PA-10,10 particles in veil V2 (PA10,10/IM7) resulted in a 40% improvement in CAI over the baseline prepreg panel P1. More interestingly, the hybrid veil architecture comprising carbon fibres and PA-10,10 particles showed unexpected synergistic effects—improving the CAI above and beyond the values measured for prepreg panels toughened by either carbon veils or toughening particles separately. When veil V2 was used as interleafs for prepreg panels, 12%, 25% and 22% improvements in CAI were found relative to the prepreg panel with 4 gsm IM7 carbon veil as interleaf and the prepreg panels (P2, P3) modified with PA-10,10 particles.

Prepreg panels containing veil V1 (P84G/IM7) and veil V4 (PILT/IM7/PA9T) as interleafs produced 45%-50% improvement in CAI compared to the non-interleaved baseline prepreg P1 panel while veils V2, V3 and V5 enhanced the CAI performance by 33%-37% over the same non-interleaved prepreg P1 panels. In addition, the disclosed hybrid veil architecture proved to be more efficient than pure carbon veils to boost the damage tolerance and resistance performance of the cured composite panels. All the disclosed hybrid veils in Table 3 delivered 10%-20% higher CAI values as compared to the panel with 4 gsm IM7 carbon veils as interleafs, despite the fact that all the hybrid veils contained approximately the same amount of carbon fibres by weight. The disclosed hybrid veil architecture also resulted in substantial reductions in the cured laminate damage area after a 30 J impact relative to the baseline prepreg P1 panels (approximately −50%) and relative to the same prepreg panel with 4 gsm carbon veils as interleafs (reductions between 10% and 50%).

TABLE 6

| Prepreg code | Particle content in prepreg (w/w) | Veil Description | Particle content in veil (w/w) | $G_{Ic}$ (in-lb/in$^2$) | σ |
|---|---|---|---|---|---|
| P1 Baseline | No Particles | No Veil | — | 1.8 | 0.1 |
| P2 | 5 | | — | 2.1 | 0.25 |
| P3 | 10 | | — | 2.4 | 0.21 |
| P1 Baseline | No Particles | IM7 (4 gsm) | — | 2.0 | 0.1 |
| | | PA10,10/IM7 (10 gsm) | 1.83 | 2.4 | 0.1 |
| | | P84G/IM7 (9 gsm) | 1.88 | 2.7 | 0.1 |
| | | PILT/IM7 (9.9 gsm) | 2.4 | 2.4 | 0.02 |
| | | CX7323/IM7 (6.4 gsm) | 0.5 | 3.0 | 0.3 |
| | | PILT/PA9T/IM7 (7.7 gsm) | 1.7 | 1.98 | 0.006 |

As shown in Table 6, the use of hybrid veils as interleafs for unidirectional prepregs can yield up to a 70% improvement in the delamination strength resistance in mode I over baseline, unmodified prepreg P1 panel (no particles, no veil).

More specifically, the inclusion of carbon veils containing PA-10,10, P84G, PILT and CX7323 particles produced, respectively, 33%, 50%, 33% and 67% improvements over non-interleaved prepreg panel P1. More interestingly, the same hybrid veils produced improvements between 15% and 40% as compared to panels with 4 gsm IM7 carbon veils as interleafs.

In addition, the novel veil architecture proved to be as efficient as interlaminar particles to toughen prepregs at a fraction of the particle content. As an example, veil V2, which comprised only 1.8 gsm of PA10,10 particles in its structure, yielded $G_{Ic}$ values well above the ones measured for prepreg P2 panel containing 5% PA-10,10 particles in the resin and comparable to a prepreg P3 panel containing 10% PA-10,10 particles in its resin.

TABLE 7

| Prepreg | Particle content in prepreg (w/w) | Veil Description | Particle content in veil (w/w) | $G_{IIc}$ (in-lb/in²) | σ |
|---|---|---|---|---|---|
| P1 Baseline | No particles | NO VEIL | — | 4.2 | 0.2 |
| P2 | 5 | NO VEIL | — | 6.52 | 0.69 |
| P3 | 10 | NO VEIL | — | 7.81 | 0.71 |
| P1 Baseline | No particles | IM7 (4 gsm) | — | 11.8 | 0.3 |
| | | PA10,10/IM7 (10 gsm) | 1.83 | 9.7 | 0.1 |
| | | P84G/IM7 (9 gsm) | 1.88 | 16.1 | 0.19 |
| | | PILT/IM7 (9.9 gsm) | 2.4 | 11.6 | 0.51 |
| | | CX7323/IM7 (6.4 gsm) | 0.5 | 13.3 | 0.8 |
| | | PILT/PA9T/IM7 (7.7 gsm) | 1.7 | 11.17 | 0.31 |

The mechanical results in Table 7 show that the hybrid veil structure can yield up to a 4-fold improvement in mode II interlaminar fracture resistance performance as compared to the baseline prepreg P1 panels.

Notably, the homogeneous distribution of a very low content of PA-10,10 particles (1.83% w/w) in veil V2 resulted in, respectively, 25% and 40% improvement in $G_{IIc}$ over prepreg panels containing the same interlaminar particles dispersed in the resin (P2, P3).

In addition, veil V1 (containing a homogeneous distribution of very small concentration (1.8 gsm) of P84G particles) and veil V5 (containing a very small concentration (0.5 gsm) of CX7323 particles) produced, respectively, 12% and 36% improvement in $G_{IIc}$ as compared to a panel containing 4 gsm IM7 carbon veils as interleafs.

Figure 8A:
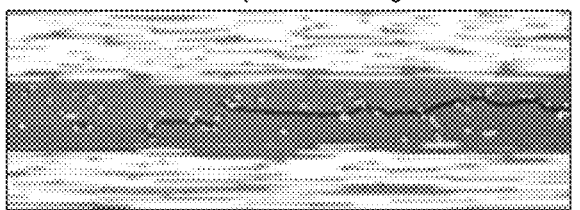
FIGS. 8A and 8B show cross-sectional views of two cured composite panels, which are interleaved with different hybrid veils, showing the crack path propagation after being subjected to a $G_{Ic}$ test.
Figure 8B:
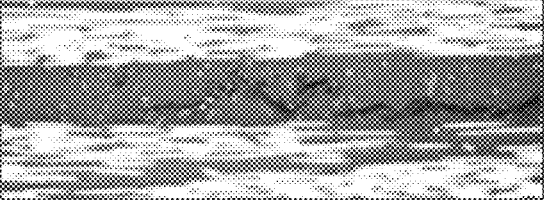

FIG. 8A shows cross-sectional views of a cured composite panel with CX7323/IM7 (V5) hybrid veils as interleafs and FIG. 8B shows a cured composite panel with P84G/IM7 (V1) hybrid veils as interleafs, after being subjected to $G_{Ic}$ test. As can be seen from FIGS. 8A and 8B, due to the novel veil architecture, a relatively high concentration of toughening particles was created in the interlaminar region resulting in a constant and controlled plastic deformation zone at the propagating crack front.

Example 3

Electrical Conductivity

Test coupons were extracted from composite panels produced in Example 2, and their z-direction conductivity was measured in DC conditions according to a 4-probe testing method. Z-direction electrical conductivity results for the cured composites are shown in Table 8.

TABLE 8

| | | Z-direction conductivity | |
|---|---|---|---|
| Prepreg code | Veil Description | (S/m) | σ |
| P1- Baseline | NO VEIL | 0.7 | 0.1 |
| | IM7 (4 gsm) | 8.0 | 0.6 |
| | PA10,10/IM7 (10 gsm) | 3.5 | 0.5 |
| | P84G/IM7 (9 gsm) | 13.7 | 0.8 |
| | PILT/IM7 (9.9 gsm) | 6.2 | 1.1 |
| | CX7323/IM7 (6.4 gsm) | 11.4 | 0.9 |
| P2 | NO VEIL | 0.05 | 0.01 |
| P3 | NO VEIL | 0.02 | 0.01 |

As compared to the baseline composite panel produced from the baseline prepreg panel (P1), the composite panel modified with 5% (P2) or 10% (P3) PA-10,10 particles resulted in a substantial reduction in z-direction conductivity of more than one order of magnitude. Such reduction in through the thickness conductivity would likely determine edge glow phenomena in aircraft composite wing structures.

In contrast, the composite panels containing the hybrid veils as interleafs resulted in z-conductivity values well above the toughened baseline panel (P1; 0.7 S/m).

It has been discovered that the addition of dielectric toughening particles in the hybrid veil did not result in any substantial loss in z-direction conductivity as compared to laminates interleaved with carbon veils. More interestingly, panels containing veils modified with CX7323 and P84 particles out-performed the panel with 4 gsm carbon veils in Z direction conductivity. Veils comprising homogeneously distributed PILT and PA-10,10 particles yielded marginally lower composite Z direction conductivity values as compared to that for the panel with carbon veils. Nonetheless, the resulting conductivity levels are believed to be sufficient to limit the edge glow phenomenon in aircraft composite wings. The results are in fact still 5 to 10 times higher than that measured for the baseline panel P1, demonstrating once again that the disclosed veil architecture is a versatile solution which can overcome issues connected to the reduction in through-the-thickness conductivity when dielectric toughening elements are incorporated in composite structures.

Example 4

Curved Beam Shear Characterization

The curved beam strength of various composite panels was determined according to ASTM D6415. Each panel was formed by laying up 24 prepreg plies according to [+,0,−, 90]3 s configuration, followed by curing in autoclave at 180° C. for 2 hours and at a pressure of 85 psi. The prepregs (P1, P2 and P3) disclosed in Example 1 were used to form the prepreg layups. Two prepreg layups were interleaved with 4 gsm IM7G carbon veils, and one prepreg layup was interleaved with PA10,10/IM7 hybrid veil (V2). The panel components are disclosed in Table 9 as well as the curved beam strength (CBS) results for the cured composite panels. 90° curved-beam test specimens were used for all tests. The curved beam strength represents the moment per unit width which causes delamination(s) to form.

TABLE 9

Curved beam shear measurements

| Prepreg | P1 Baseline | P2 | P3 | P1 - Baseline | | P3 |
|---|---|---|---|---|---|---|
| Veil | — | — | — | IM7G carbon (4 gsm) | V2 | IM7G carbon (4 gsm) |
| Lay-up | | | [+, 0, -, 90]3 s | | | |
| CBS (MPa) | 1824.4 | 1703.6 | 1384.0 | 1815.5 | 1691.5 | 1585.7 |
| σ | 124 | 76.4 | 19.6 | 43.4 | 38.5 | 62.0 |

The results reported in Table 9 demonstrate that the inclusion of polyamide interlaminar particles in prepregs P2 and P3 resulted in substantial reductions in the curved beam shear strength (CBS) performance of the cured composite panels as compared to the baseline panel P1. A 25% reduction in CBS values was measured for the prepreg panel modified with 10% PA-10,10 particles (P3). Low areal weight IM7 carbon veil (4 gsm) did not affect the CBS performance, which is in line with the unmodified baseline P1 panel.

The inclusion of the hybrid veil V2 (PA10,10/IM7) resulted in minimal reduction in CBS value as compared to laminates made of baseline prepreg P1 while the combination of 4 gsm IM7G carbon veil and particle-modified prepregs (P3) showed substantially lower CBS value as compared to the baseline panel P1 (−20%). In this case, the experimental strength is the numeric average of the values measured for the two different modifiers (carbon veil and PA-10,10 particles).

In contrast to what is observed for prepreg panels toughened with thermoplastic particles, the hybrid veil architecture was capable of maintaining high CBS values and the presence of specific toughening particles simultaneously improved the mechanical and electrical performance of the cured composites.

Example 5

For channel and angle components formed from composite laminates, the distortion in shape will be visible by a change in angle. This phenomenon is often termed as spring-in and is a result of different expansion in the in-plane and the through-thickness direction of the laminate. The corner radius does not affect the spring-in angle if the laminate is homogeneous orthotropic through the thickness. However, when a corner is produced by autoclave where only one half of the tool is stiff, local corner thinning/thickening during processing is expected. During traditional prepreg manufacturing it is well known that corner thickening might occur at female tool corners and corner thinning might occur at male corners. A change in thickness means a change in fibre volume fraction which affects spring-in.

Composite panels were manufactured on a tool with a convex radius to investigate the effect on thickness and spring-in. [0]24 prepreg layups were formed on the tool using prepregs P1, P2, P3, following by curing in autoclave at 180° C. for 2 hours and at a pressure of 85 psi. P1 prepreg layup was also interleaved with 4 gsm IM7G carbon veil and hybrid IM7/PA10,10 veil V2, while P3 with interleaved with the 4 gsm carbon veil as indicated in Table 10.

The tool was made from carbon fibre composite with a convex radius of R8. This means that the panels manufactured on the convex corner will have an inner and outer radius of 8 mm and 12 mm, respectively. The radius thinning was calculated as difference between the average flange thickness and radius one. The bulk factor was calculated as percentile variation compared to the nominal panel thickness.

The results of the radius thinning analysis are shown in Table 10.

TABLE 10

Cured measurements - Micrometer

| Prepreg | P1 Baseline | P2 | P3 | P1 Baseline | V2 | P3 |
|---|---|---|---|---|---|---|
| Veil | NO VEIL | | | IM7G carbon (4 gsm) | V2 | IM7G carbon (4 gsm) |
| Lay-up | | | [0]24 | | | |
| Mean t flat (mm) | 4.77 | 4.79 | 4.87 | 4.76 | 4.83 | 4.73 |
| σ | 0.07 | 0.06 | 0.08 | 0.08 | 0.10 | 0.07 |
| Flange bulk (%) | 7.45 | 8.12 | 9.93 | 5.3 | 3.0 | 5.1 |
| Mean t radius (mm) | 4.20 | 4.44 | 4.57 | 4.52 | 4.59 | 4.64 |
| σ | 0.10 | 0.07 | 0.05 | 0.14 | 0.05 | 0.06 |
| Radius Thinning (mm) | −0.57 | −0.34 | −0.29 | −0.24 | −0.24 | −0.09 |
| Radius bulk (%) | −5.0 | — | 3.0 | — | — | −2.03 |

It was found that the baseline prepreg panel (P1) cured in an autoclave on a convex tool showed approximately 5% decrease in bulk at the radius and a 12% difference in thickness as compared to the flange sections. The presence of PA-10,10 interlaminar particles can partially reduce such phenomenon. The lowest bulk factors and the minimum difference in thickness between the radius and flange portions were measured in the panel modified with the hybrid veil V2. In all the other cases, even if lower bulk factors were calculated for the radius portion, substantial thickening phenomena were observed at the flange especially for the baseline panel P1 and particle-modified panels (P2, P3).

Table 11 shows results for prepreg panels produced according the same method described above but the layup configuration is quasi-isotropic, more specifically, [+,0,−, 90]3 s. Similar results were found for the quasi-isotropic panels, see Table 11. The lowest bulk factors were measured for the panel with hybrid veils V2 as interleafs. Similarly to what observed for the UD panels the unmodified material showed a 5% thinning of the radius and a 2.5% thickening in the flange thickness as compared to the baseline prepreg P1 panel. High bulk factors were also observed for the flanges of the particle-modified panels (P2, P3).

TABLE 11

Cured measurements - Micrometer

| Prepreg | P1 Baseline | P2 | P3 | P1 Baseline | V2 |
|---|---|---|---|---|---|
| Veil | NO VEIL | | | IM7G carbon (4 gsm) | V2 |
| Lay-up | | | [+, 0, -, 90]3 s | | |
| Mean t flat (mm) | 4.64 | 4.64 | 4.61 | 4.61 | 4.64 |
| σ | 0.05 | 0.04 | 0.04 | 0.05 | 0.03 |
| Flange bulk (%) | 2.48 | 4.51 | 4.00 | — | — |
| Mean t radius (mm) | 5.19 | 4.32 | 4.38 | 4.44 | 4.51 |
| σ | 0.08 | 0.06 | 0.04 | 0.03 | 0.04 |
| Radius Thinning (mm) | −0.45 | −0.32 | −0.13 | −0.17 | −0.13 |
| Radius bulk (%) | −5.0 | −2.54 | −1.1 | −2.2 | −2.16 |

Example 6

A 196 gsm IMS65E24K unidirectional non-crimp fabric (UD-NCF), supplied by Saertex (UK), was used to produce composite laminates by liquid resin infusion. The fabric contained 4 gsm polyester stitching thread for keeping the carbon tows together. 5 gsm of fine polyester threads were laid down across the fabric to provide lateral integrity and stability to the fabric.

The fabric was coated with 5 gsm of thermoplastic-modified, epoxy-based binder (Cycom® 7720 from Cytec Engineered Materials). A powder scattering method was used to deposit about 5 gsm of the binder composition on both faces of each fabric. The fabrics with the scattered powder were run through a double belt press to further drive the binder through the fibre web and insure a good cohesion of the UD fibre web. This is called a stabilization step. Then the stabilized fabrics were slit into 50 mm wide tapes having a width variation of less than +/−1.0 mm. Edge quality of the slit tapes was sufficiently clean with limited bridging fibres, fuzz, and other observed defects.

The non-crimp fabric from was cut into smaller plies, and the plies were laid-down in a [+10/−/90]3 s stacking sequence to form a layup. UD-NCF lay-ups were interleaved using V1, V4 and a 4 gsm IM7 carbon veil. The veil interleaved UD-NCF layups were then consolidated by pre-forming the lay-up in an oven at 130° C. for 30 minutes and infused with Prism® EP2400 (toughened epoxy system available from Cytec Industries Inc.). Panels having a $V_f$ (fibre volume fraction) in the 54%-55% range were produced after curing the infused preforms at 180° C. for 2 h.

For comparison purposes the same pristine unidirectional non-crimp fabric was used to prepare an otherwise identical test panel.

Mechanical Characterization—Non-Crimp Fabric (NCF)

A variety of mechanical properties were measured to evaluate the effects of the veil architecture and composition on the cured composite performance. Tests were performed in accordance with the test methods reported in Table 12.

TABLE 12

| Property | Testing conditions | Lay-up configuration | Unit measured | Standard Test |
|---|---|---|---|---|
| CAI - 270 in-lbs | RT | [+/0/−/90]3 s | Ksi | ASTMD7136 |
| $G_{Ic}$ - DCB | RT | [0]20 | in-lb/in² | ASTM-D5528 |
| $G_{IIc}$ - ENF | RT | [0]20 | in-lb/in² | |

RT refers to room temperature (25° C.). DCB refers to Double Cantilever Beam and ENF refers to End Notched Flexure.

The CAI, $G_{Ic}$ and $G_{IIc}$ results are reported in Tables 13 and 14. σ denotes the standard variation.

TABLE 13

| Non-crimp fabric | Veil | Particle content in veil (w/w) | CAI (KSI) | σ | Damaged area (mm²) |
|---|---|---|---|---|---|
| UD-NCF | No Veil | — | 210 | 3.2 | 1338 |
| | IM7G Carbon (4 gsm) | — | 246.1 | 10.8 | 1156 |
| | V1 | 1.9 | 256.5 | 10.8 | 791 |
| | V4 | 1.7 | 275.3 | 12.7 | 694 |

As shown in Table 13, the use of hybrid veils as interleafs for non-crimp fabrics can produce up to a 30% improvement in the compression strength after a 30 J impact as compared to the same panel formed from unmodified non-crimp fabrics. More particularly, the homogeneous distribution of small quantities (1.83 gsm) of PILT particles in veil V4 produced a 40% improvement in CAI over the baseline prepreg panel P1. Moreover, the hybrid veil V4 architecture, which contains carbon fibers, PA9T fibers and PILT particles, yielded unexpected synergistic effects—improving the CAI above the values measured for NCFs interleaved with 4 gsm carbon veils. NCFs interleaved with veils V1 produced approximately 25% improvement in CAI as compared to the non-interleaved baseline fabrics.

As shown in Table 14, the use of hybrid veils as interleafs for unidirectional non-crimp fabrics can produce up to a 35% improvement in the delamination strength resistance in mode I over 4 gsm carbon interleaved non-crimp fabrics.

TABLE 14

| Non-crimp fabric | Veil | Particle content in veil (w/w) | $G_{Ic}$ (in-lb/in²) | σ | $G_{IIc}$ (in-lb/in²) | σ |
|---|---|---|---|---|---|---|
| UD-NCF | IM7 Carbon (4 gsm) | — | 2.04 | 0.10 | 10.6 | 0.28 |
| | V1 | 1.9 | 2.71 | 0.12 | 12.76 | 1.13 |
| | V3 | 2.4 | 2.17 | 0.08 | 13.68 | 0.98 |
| | V4 | 1.7 | 2.32 | 0.04 | 14.25 | 1.08 |

More particularly, the inclusion of nonwoven carbon veils containing homogeneously dispersed particles yielded 35% and 10% improvements, respectively, for P84G and PILT relative to non-crimp fabrics interleaved with carbon veils. Moreover, veil V4 (PA9T and carbon fibres combined with PILT particles) improved the $G_{Ic}$ performance by approximately 15% as compared to the non-crimp fabrics interleaved with carbon veils.

The mechanical results in Table 14 show that the disclosed veil architecture can provide up to a 40% improvement in mode II inter-laminar fracture resistance performance compared to the non-crimp fabrics interleaved with carbon veils.

Notably, veil V1 (containing a very low content (1.9% w/w) of P84G particles) and veil V3 (containing a low content (2.4%) of PILT particles) produced, respectively, a 30% and 40% improvement in $G_{IIc}$ over non-crimp fabrics interleaved with carbon veils. While the combination of PA9T fibres, IM7 carbon fibres and PILT particles in veil V4 produced approximately a 45% increase in $G_{IIc}$ as compared to non-crimp fabrics interleaved with carbon veils.

What is claimed is:

1. A hybrid veil that is flexible, self-supporting, and is permeable to liquid and gas, comprising:
   (a) intermingled, randomly arranged carbon fibres in the form of a nonwoven structure;
   (b) polymeric particles dispersed throughout the nonwoven structure, wherein a majority of the polymeric particles are penetrating through the thickness of the nonwoven structure; and
   (c) a polymeric or resinous binder present throughout the veil,
   wherein each of the polymeric particles consists of one or more thermoplastic polymers, or one or more elastomeric polymers, or crosslinked thermoplastic polymers, and
   wherein the binder is present in an amount of 5% to 25% by weight, based on the total weight of the veil.

2. The hybrid veil of claim 1, wherein the hybrid veil has an areal weight of less than or equal to 12 gsm.

3. The hybrid veil of claim 2, wherein the hybrid veil has an areal weight of 5 gsm to 12 gsm.

4. The hybrid veil of claim 1, wherein weight ratio of carbon fibres to polymeric particles in the veil is within the range of 5:1 to 1:1.

5. The hybrid veil of claim 1, wherein the binder is present in an amount of 10% to 20% by weight, based on the total weight of the veil.

6. The hybrid veil of claim 1, wherein the carbon fibres of the nonwoven structure are chopped fibres having lengths in the range of about 3 mm to about 18 mm.

7. The hybrid veil of claim 1, wherein the carbon fibres of the nonwoven structure have cross-sectional diameters in the range of about 3.0 μm to about 15 μm.

8. The hybrid veil of claim 1, wherein each of the polymeric particles consists of are polyamide or polyimide particles.

9. The hybrid veil of claim 1, wherein the particles have a particle size distribution d50 in the range of about 10 μm to about 50 μm, as measured by laser diffraction.

10. The hybrid veil of claim 1, wherein the polymeric or resinous binder comprises a component selected from: thermoplastic polymers, elastomeric polymers, thermosetting resins, copolymers thereof and combinations thereof.

11. The hybrid veil according to claim 10, wherein the binder comprises a component selected from: vinyls, including poly vinyl alcohol (PVA), poly ethylene vinyl alcohol (PEVOH), poly vinyl acetate, poly vinyl ether, poly vinyl chloride (PVC) and poly vinyl ester; butadienes; silicones; polyesters; polyamides; cross-linked polyesters; acrylics; epoxies; phenoxies; phenolics; polyurethanes; phenol-formaldehyde resin; urea-formaldehyde resin; copolymers thereof and combinations thereof.

12. A composite laminate comprising:
a layup of prepreg plies arranged in a stacking arrangement, each prepreg ply comprising a layer of reinforcement fibres that has been impregnated with a curable matrix resin; and
the hybrid veil of claim 1 interleaved between two adjacent prepreg plies.

13. A fibrous preform configured for liquid resin infusion, comprising:
a plurality of fibrous layers that are permeable to liquid resin; and
the hybrid veil of claim 1 interleaved between two adjacent fibrous layers.

14. The fibrous preform of claim 13, wherein the fibrous layers are selected from:
woven and nonwoven fabrics, and multi-axial fabrics.

15. A prepreg comprising:
reinforcement fibres impregnated with a curable resin; and
the hybrid veil of claim 1 embedded in the same curable resin.

16. The prepreg of claim 15, wherein the reinforcement fibres are unidirectional carbon fibres.

17. A fabric that can be infused with a liquid resin, comprising:
at least one fabric ply comprising unidirectional fibers; and
the hybrid veil of claim 1 attached to the fabric ply.

* * * * *